United States Patent [19]
Torizawa et al.

[11] Patent Number: 5,255,200
[45] Date of Patent: Oct. 19, 1993

[54] NUMERICAL CONTROL INFORMATION GENERATING SYSTEM

[75] Inventors: Yoshio Torizawa; Yukinori Otsubo; Kenji Ito, all of Niwa, Japan

[73] Assignee: Kabushiki Kaisha Okuma Tekkosho, Aichi, Japan

[21] Appl. No.: 621,438

[22] Filed: Dec. 4, 1990

[30] Foreign Application Priority Data

Dec. 4, 1989 [JP] Japan ................... 1-314540

[51] Int. Cl.$^5$ ............ G05F 15/46; G05B 19/18
[52] U.S. Cl. ............... 364/474.22; 364/474.2; 364/474.33
[58] Field of Search .......... 364/474.22, 474.2, 474.21, 364/474.29, 474.33, 474.32, 474.31

[56] References Cited

U.S. PATENT DOCUMENTS

| | | | |
|---|---|---|---|
| 4,535,408 | 8/1985 | Kishi et al. | 364/474.33 |
| 4,698,573 | 10/1987 | Niwa | 364/474.33 |
| 4,799,143 | 1/1989 | Tanaka et al. | 364/474.2 |
| 5,095,440 | 3/1992 | Suzuki et al. | 364/474.32 |

Primary Examiner—Jerry Smith
Assistant Examiner—Steven R. Garland
Attorney, Agent, or Firm—Wenderoth, Lind & Ponack

[57] ABSTRACT

A numerical control information generating system prevents a tool from interfering with a work when the tool is moved from a tool change position to a cycle start point or from a cycle end point to the tool change position by setting a step start point and a step end point for each machining step outside of a before-machining shape, and classifying the positional relation of the shape upon completion of machining with the machining steps into the outer face, inner face, the front face, the outer rear face and the inner rear face so that based on the information denoting the positional relation the paths of the tool from the tool change position to the step start point or from the step end point to the tool change position are determined. When a same tool is used for machining in plural sequential steps, the time required to move the tool between the step to another can be shortened since the tool is moved from the end point of a step to the start point of the subsequent step.

8 Claims, 8 Drawing Sheets

|  | X AXIS | Z AXIS |
|---|---|---|
| CYCLE START POINT | 70 000 | 85 000 |
| CYCLE END POINT | 80 000 | 60 000 |
| STEP START POINT | 82 000 | 85 000 |
| STEP END POINT | 82 000 | ** *** |
| MACHINING POSITION | FRONT FACE | |

FIG. 10

NUMERICAL CONTROL INFORMATION GENERATING SYSTEM

BACKGROUND OF THE INVENTION

This invention relates to a numerical control information generating system which receives data denoting the shape of a work upon completion of a machining process and the shape of the work prior to the machining process, and which generates numerical control information associated with the machining process based on such data.

Figure 1:
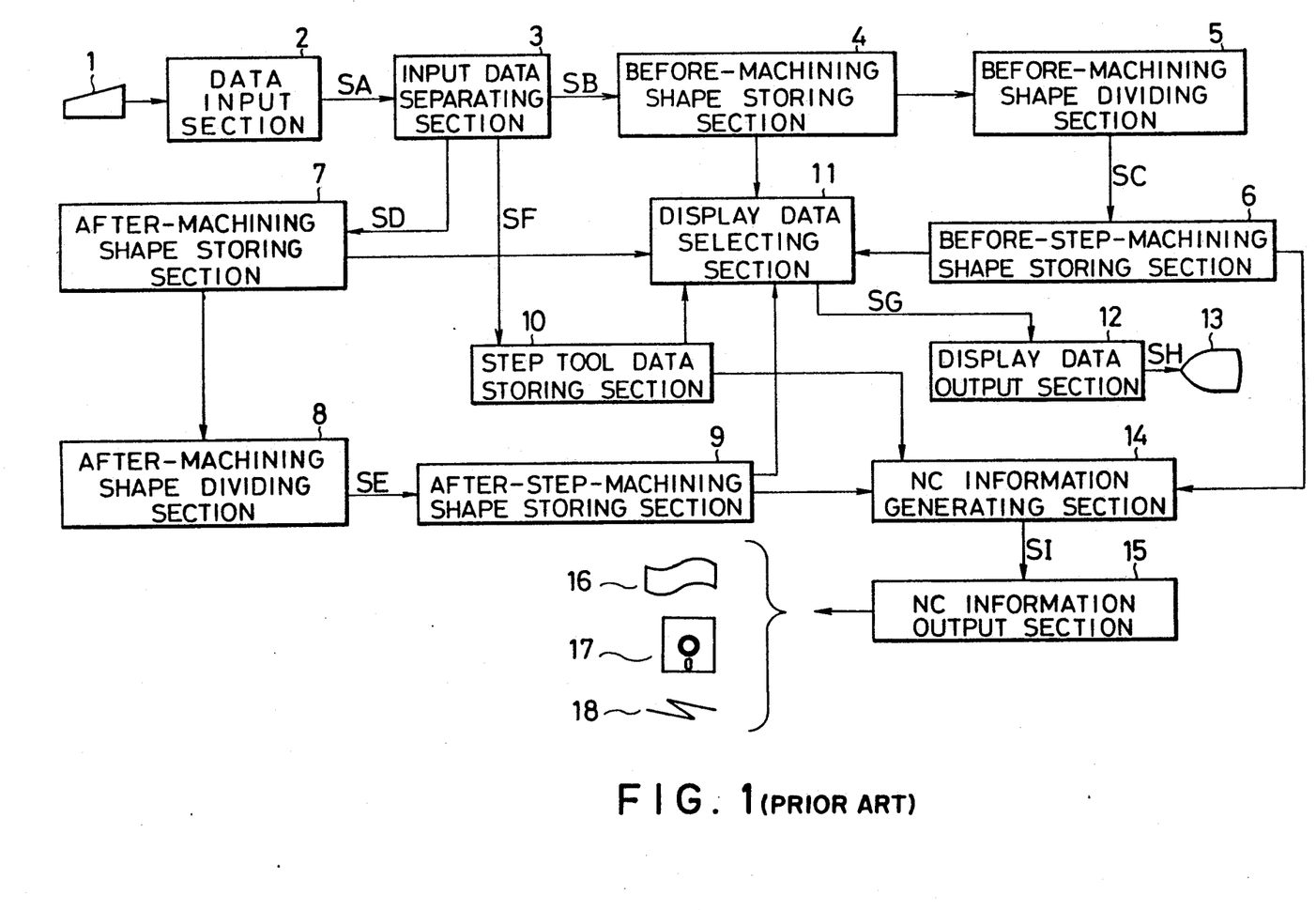
FIG. 1 is a block diagram of a prior art numerical control information generating system.

FIG. 1 is a block diagram of a prior art numerical control information generating system including a data input section 2, which receives data from an external data input unit 1 and outputs input data SA, and an input data separating section 3 which receives the input data SA from the data input section 2 separates at each machining step the input data SA into before-machining shape data SB, after-machining shape data SD and tool data SF and respectively outputs at each machining step thus separated data to a before-machining shape storing section 4 for the before-machining shape data SB, an after-machining shape storing section 7 for the after-machining shape data SD and a step tool data storing section 10 for the tool data SF. That is, the before-machining shape storing section 4 receives and stores the before-machining shape data SB from the input data separating section 3, the after-machining shape storing section 7 receives and stores the after-machining shape data SD, and the step tool data storing section 10 receives and stores the step tool data SF. The numerical control information generating system further includes a before-machining shape dividing section 5 which divides for each machining step the machining areas of the work according to the before-machining shape data SB and forms resultant before-step-machining shape data SC; a before-step-machining shape storing section 6 which stores the before-step-machining shape data SC formed by the before-machining shape dividing section 5; an after-machining shape dividing section 8 which divides for each machining step the machining areas of the work according to the after-machining shape data SD and forms resultant after-step-machining shape data SE; an after-step-machining shape storing section 9 which stores the after-step-machining shape data SE formed by the after-machining shape dividing section 8; a display data selecting section 11 which receives the before-machining data SB, the before-step-machining shape data SC, the after machining shape data SD, the after-step-machining shape data SE and the step tool data SF, selects data to be displayed at a display unit 13 such as CRT and outputs the same as the display data SG; a display data output section 12 which receives the data SG and outputs the same as a display signal SH to display unit 13; a numerical control information generating section 14 which receives the before-step-machining shape data SC, after-step-machining shape data SE and the step tool data SF and generates numerical control information SI; and a numerical control information output section 15 which receives thus generated numerical control information SI and externally outputs the same in the form of a paper tape 16, a magnetic disc 17 or communication signals 18.

The prior art numerical control information generating system generates the numerical control information, which has machining cycle reference points for each machining step, so that a tool is first moved from the position where the tool is changed or from the machining cycle reference point of a preceding machining step to the machining cycle reference point of the machining step where the work is to be machined, the machining cycle is executed in series and upon completion of the machining cycle, the tool is positioned at the machining cycle reference point.

Figure 2:
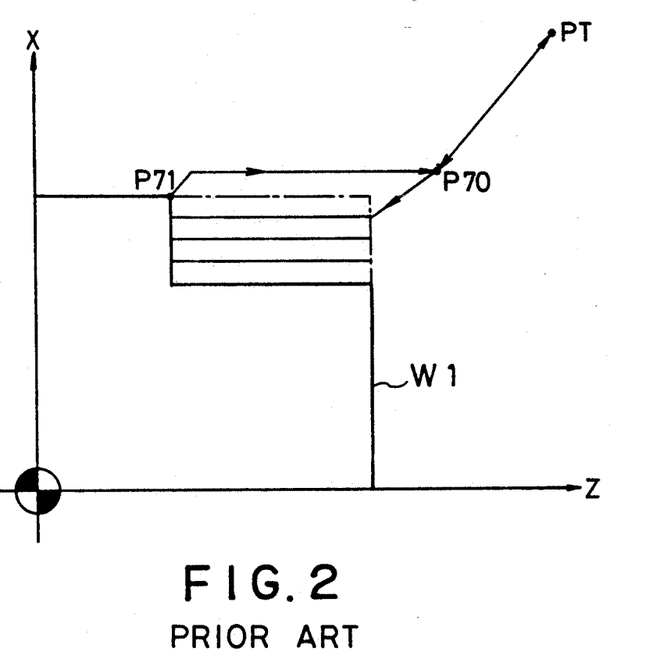
FIGS. 2 and 3 are views showing examples of machining processes carried out by the prior art system, respectively.
Figure 3:
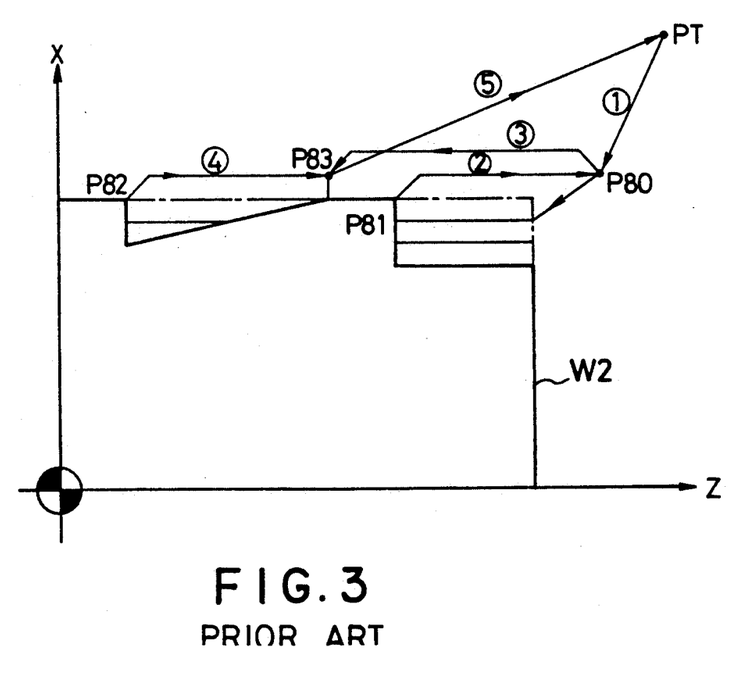

FIG. 2 illustrates the above-mentioned process, in which the tool is first moved from a position PT where the tool is changed to a reference point P70, executes a series of the machining cycle on a work W1, returns from an end point P71 of the machining cycle to the reference point P70, and then moves to the position PT. FIG. 3 shows another example wherein the tool first takes the path "1" from the point PT to the first cycle reference point P80, executes the first series of the machining cycle on a work W2, and returns from the point P81 to the point P80 along the path "2". The tool takes the path "3" from the point P80 to the reference point P83 for the second machining cycle, executes the second series of the machining cycle on the work W2, returns via the path "4" from the end point P82 to the reference point P83 and then to the position PT along the path "5".

In the above-mentioned prior art numerical control information generating system, substantial time is expended in moving the tool when the same tool is used for plural steps, from one machining cycle reference point to another. More particularly, the system must return the tool at the particular reference point set for each step everytime a step ends, and to move the tool to the reference point of the subsequent step along a path where the tool does not interfere with the work. Moreover, when the tool is being moved from the tool change point to the cycle reference point or from the reference point to the tool change point, the tool is likely to interfere with the work depending on the positional relation between the work shape upon completion and the machining step.

SUMMARY OF THE INVENTION

This invention was conceived to overcome the defects of the prior art numerical control information generating system and aims at providing a numerical control information generating system which can shorten the time required to move the tool between machining steps even when the same tool is used for plural steps, and which can prevent the interference of the tool with the work when the tool moves from the tool change point to the cycle start point or from the cycle end point to the tool change point simply by setting a start point and an end point for each machining step, executing the series of the machining cycle after the tool is positioned at the start point, and positioning the tool at the step end point after the machining cycle has been completed.

According to one aspect of this invention, for achieving the objected described above, there is provided a numerical control information generating system which receives data denoting the shape of a work when completed and the shape the work before the machining, divides the machining area which is expressed as the difference between the work shape when completed and the work shape before machining into one or more areas corresponding to machining steps, and prepares numerical control information in the order of the machining steps corresponding to each divided machining area, which is characterized in that the numerical control information is formed in such a manner that a machining step start point and a machining step end point are set for each machining step thus divided so that a tool is positioned at the machining step start point to start a series of a machining cycle, and then positioned at the machining step end point after completion of the machining cycle.

The nature, principle and utility of the invention will become more apparent from the following detailed description when read in conjunction with the accompanying drawings.

DESCRIPTION OF THE PREFERRED EMBODIMENT

Figure 4:
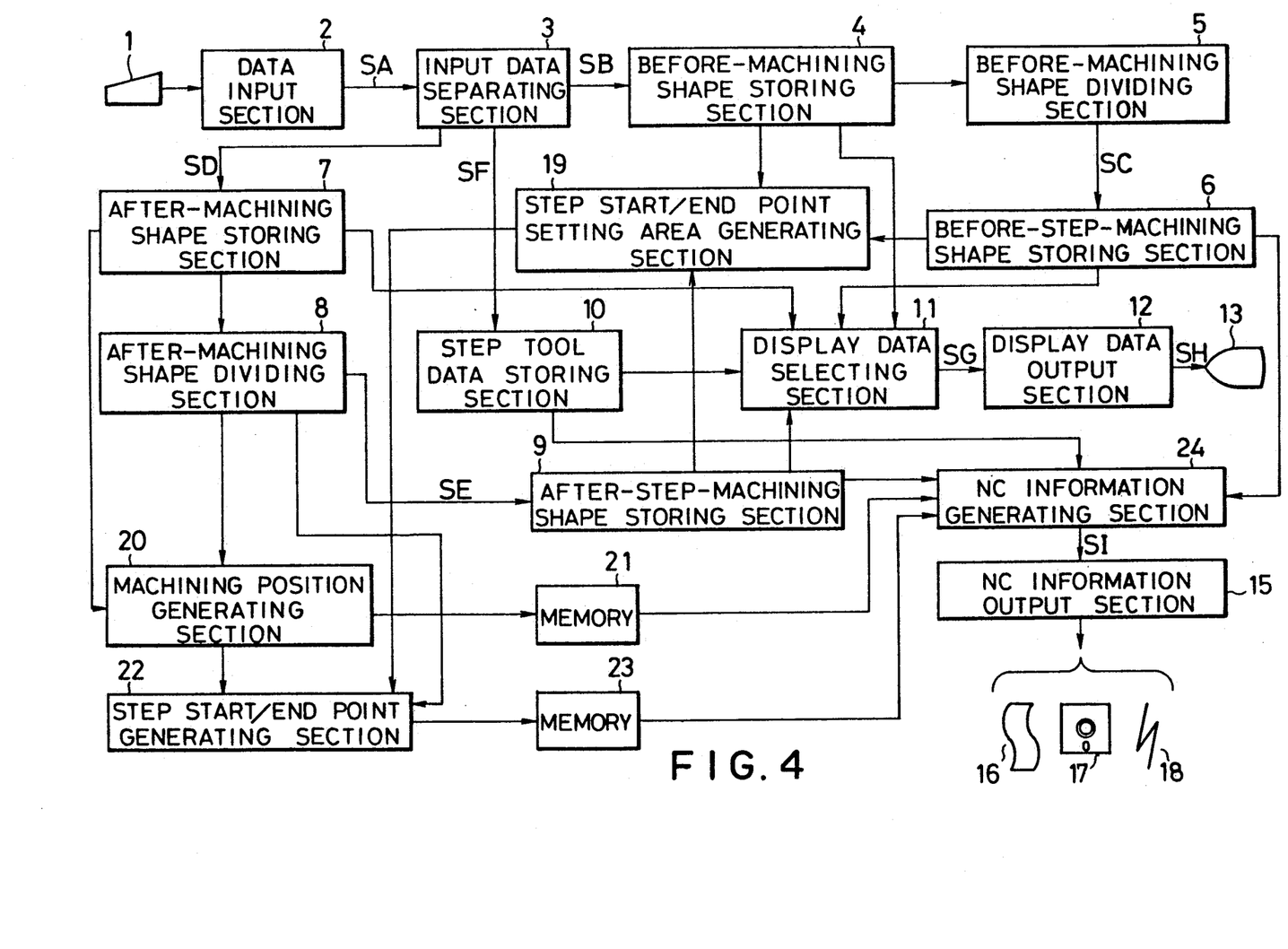
FIG. 4 is a block diagram showing an embodiment of the numerical control information generating system according to this invention.

FIG. 4 shows an embodiment of the numerical control information generating system of the present invention. Those parts shown in FIG. 4 which are the same as those shown in FIG. 1 are denoted with the same reference numerals to avoid duplication in the description.

In addition to the components of the prior art numerical control information generating system, the system of the present invention includes a step start/end point setting area generating section 19, a machining position generating section 20, a memory 21 for the machining position at each machining step, a step start/end point generating section 22 and a memory 23 for the start/end point for each machining and a numerical control information generating section 24.

The step start/end point setting area generating section 19 determines and generates an area in which the start point and the end point of a machining step can be set based on the before-machining step stored in the before-machining shape storing section 4, the after-step-machining shape stored in the after-step machining shape storing section 9, and the before-step-machining shape stored in the before-step-machining shape storing section 6. The generated area is generally determined not to include the before-machining shape by setting it outside of the scope defined by the maximum and minimum values on each axis of the before-machining shape. The area may be modified as the machining proceeds by referring to the shapes which will have ended immediately before the machining step. The machining position generates section 20 generates data denoting the positional relation between the after-machining shape stored in the after-machining shape storing section 7 and the after-step-machining shape formed by the after-machining shape dividing section 8. The information denoting the positional relation for a lathe turning machine is divided into the data of an outer face, inner face, front face, outer rear face and inner rear face. The memory 21 stores the positional relation information formed by the machining position generating section 20 for each machining step.

The step start/end point generating section 22 generates the step start point and end point based on the area generated by the step start/end point setting area generating section 19, the after-step-machining shape formed by the after-machining dividing section 8, and the positional relation information formed by the machining position generating section 20. A step start point is absolutely determined from the positional relation information generated by the machining position generating section 20 and is located at the point where a straight line which generally passes the start point of the shape after a machining step and in parallel to the axis crosses with the area generated by the step start/end point setting area generating section 19. An end point is absolutely determined from the positional relation information generated by the machining position generating section 20 and is located at the point where a straight line which passes an end point of each machining cycle and in parallel to the axis crosses with the area set by the step start/end point setting area generating section 19. The memory 23 stores the step start point and the end point formed by the step start/end point generating section 22 for each machining step.

The data denoting the machining position, the step start point and the end point for each step thus obtained are used by the numerical control information generating section 24 in order to generate the paths for moving the tool between steps when the same tool is used for executing plural machining steps or for moving the tool from the tool change position to the cycle start point or from the end point to the tool change point.

FIGS. 5 through 9 illustrate the generation of the step start point, the step end point and the machining position and examples of the machining information therewith. The operation of the system according to this invention will now be described referring to these figures.

Figure 5:
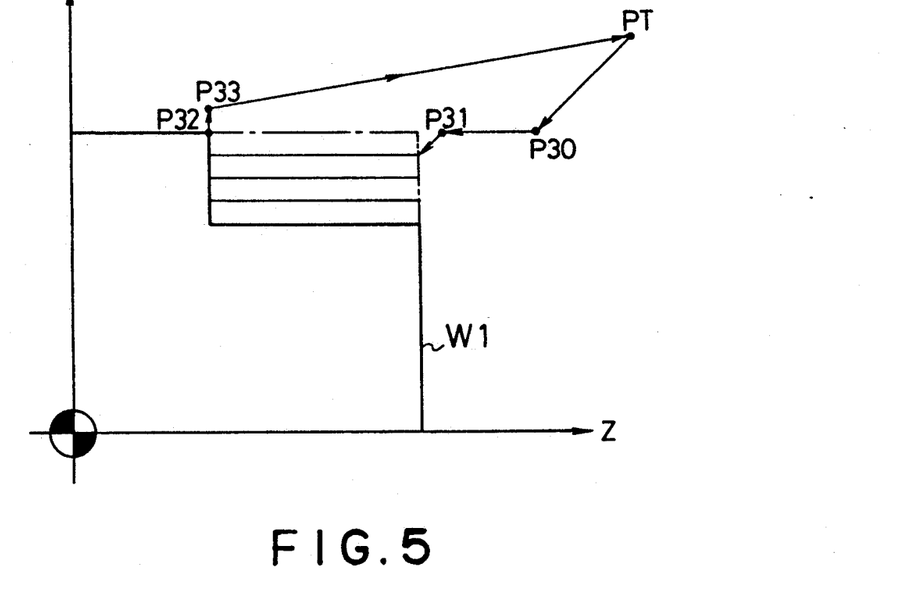
FIGS. 5 through 9 respectively illustrate processes to form the machining step start point, machining step end point and machining position and examples of machining information therewith.
Figure 6:
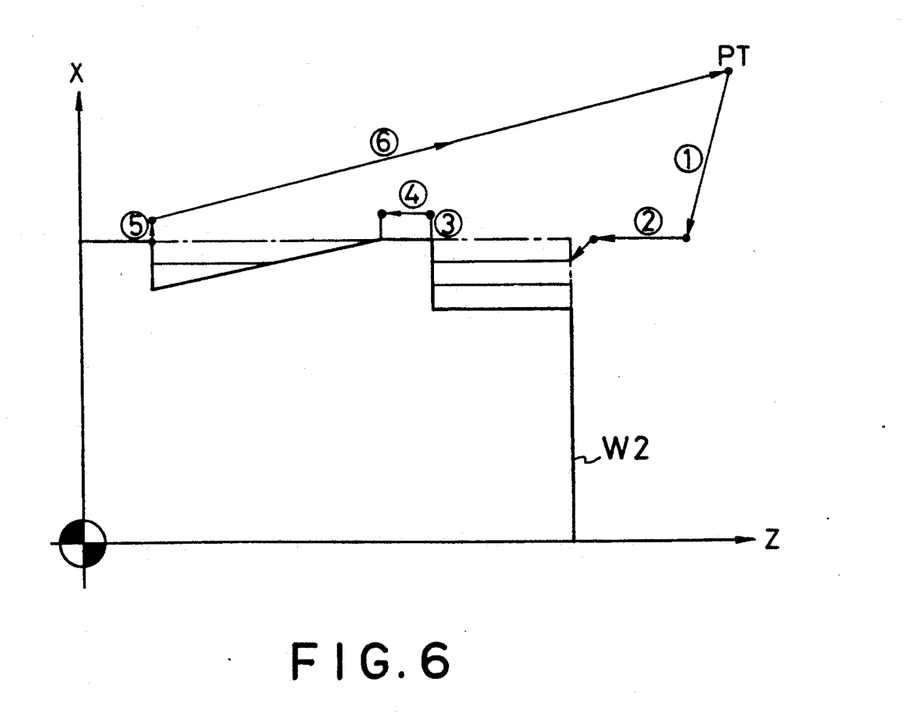

FIGS. 5 and 6 show examples of machining wherein areas defined with a dot-and-chain and a bold line are to be machined. The example of FIG. 5 illustrates a machining wherein a tool moves from the point PT to the point P30, executes a predetermined machining cycle, finishes the machining cycle at the end point P32, moves to the point P33, and then returns to the PT. When compared with the example of the prior art shown in FIG. 2, it is shown that the cycle reference point P70 of FIG. 2 is replaced in FIG. 5 with the path comprising the step start point P30, the cycle start point P31 and the step end point P33. In FIG. 2, the tool is first positioned at the point PT and then moved to the point P70 and then made to execute the machining cycle. When the machining cycle ends, the tool is removed from the point P71 to the reference point P70, and then returned to the point PT. FIGS. 3 and 6 show examples of machining in two steps with one common tool, when compared with the examples in the prior art shown in FIG. 3, it is obvious that the machining shown in FIG. 6 has less wasteful movements.

Figure 7:
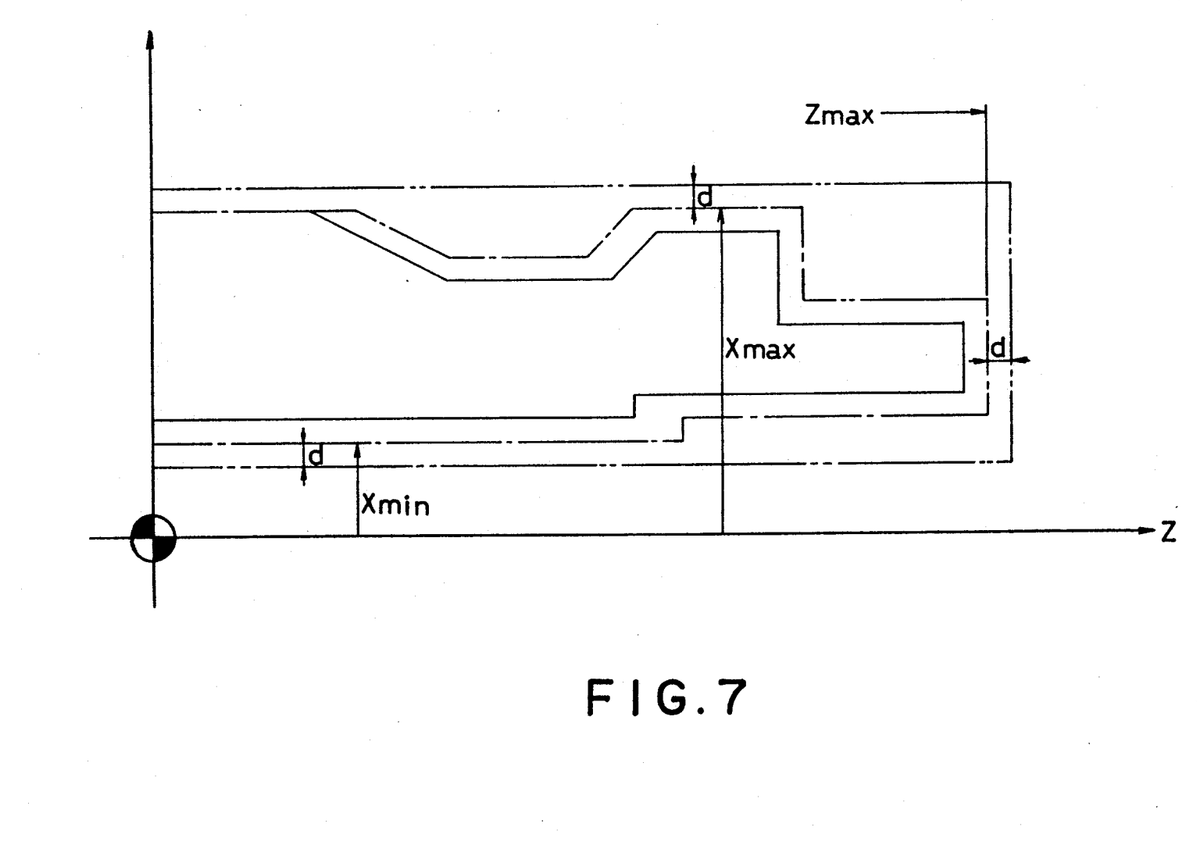

FIG. 7 shows an example of setting an area in which the step start point and the end point may be determined based on the before-machining shape. The area in which the step start and end points are set is generally determined outside of a scope defined by the maximum and the minimum values on the respective axes of the before-machining shape so as not to include the before-machining shape. In FIG. 7, the solid line show the work shape at the time the machining is completed while the dot-and-chain line shows the before-machining shape. In the upper left portion of the figure, the 5 shapes, or the shape upon completion and the before-machining shape are over-lapped, indicating that the area is not to be machined. The two-dot-and-chain line in the figure depicts where the step start point and the step end point may be set, and is located outside the work before-machining shape with a distance d as an allowance from the maximum values $X_{max}$, $Z_{max}$ on each axis and the minimum value $X_{max}$. The maximum values $X_{max}$, $Z_{max}$, and the minimum $X_{min}$, may be modified based on the shape machined by the steps up until the immediately preceding one. For instance, if pre-machining requires drilling, value $X_{min}$ after drilling is set as the drill diameter.

Figure 8:
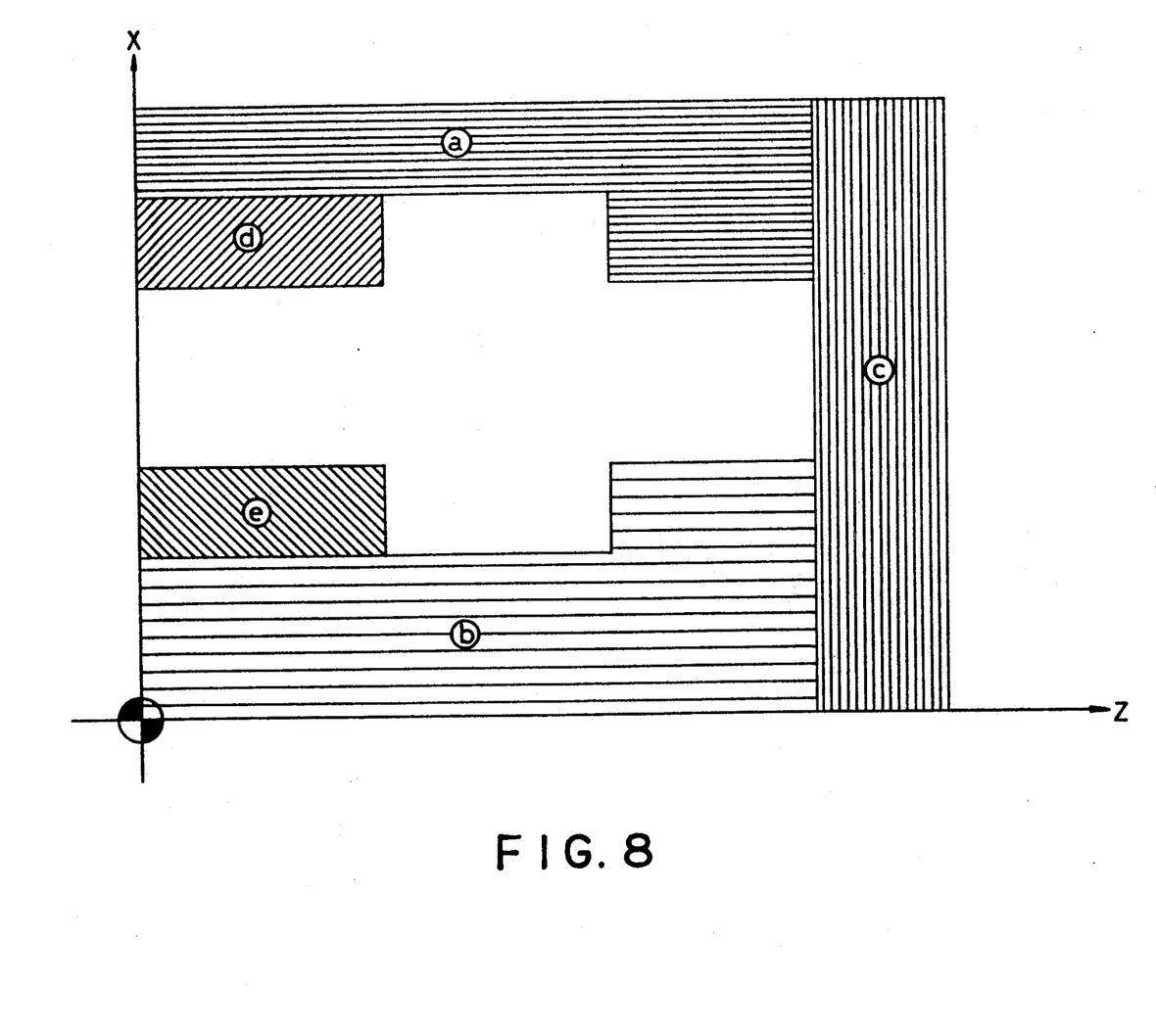

FIG. 8 shows an example of dividing the positional relation of the completed shape with the machining steps into the data on the outer face, the inner face, the front face, the outer rear face and the inner rear face wherein the area "a" denotes the outer face, the area "b" the inner face, the area "c" the front face, the area "d" the outer rear face, and the area "e" the inner rear face. The classes "a" through "e" are referred to every time the tool is moved between the steps. By moving the tool along the line where the step start and the end start points may be set as shown in FIG. 7, the tool is moved from the tool change position to the step start position, from the step end point to the tool change position, and from the step end point to the start point of the machining step subsequent thereto which is classified differently, and the tool is prevented from interfering with the work when being positioned at the step start point.

Figure 9:
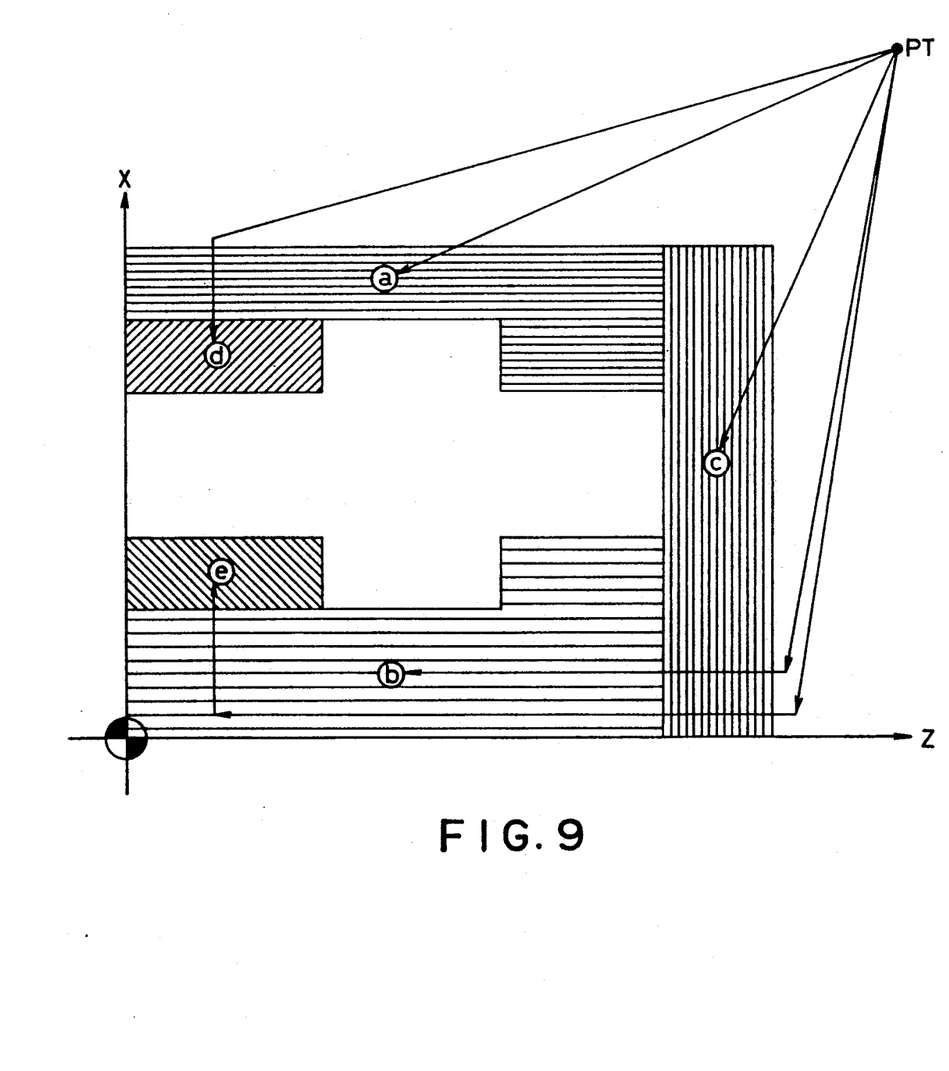

FIG. 9 shows the paths by which the tool moves from the position PT to the areas "a" through "e".

The step start point or the step end point is often modified by an operator in order to shorten the machining time. When modifying, the operator often moves the start point or the end point in terms of only one axis from the position of the immediately proceeding machining step. For instance, when the tool is moved from the machining cycle end point to the step end point, it moves in the positive direction on the X axis when the machining position is on the outer face while it moves in the positive direction of the Z axis when it is on the front face. Errors are less likely to occur and the input operation is simpler if the data on the axis to be moved is set rather than setting all the coordinates when the step start point or the step and point is to be modified. In order to do this, the numerical control information may be formed in such a manner that the data on the axis where the tool need not be moved from the cycle end point is kept blank, whereby the tool is not moved with respect to the axis with the blank data when the tool is positioned at the step end point after the completion of the machining cycle.

Figure 10:
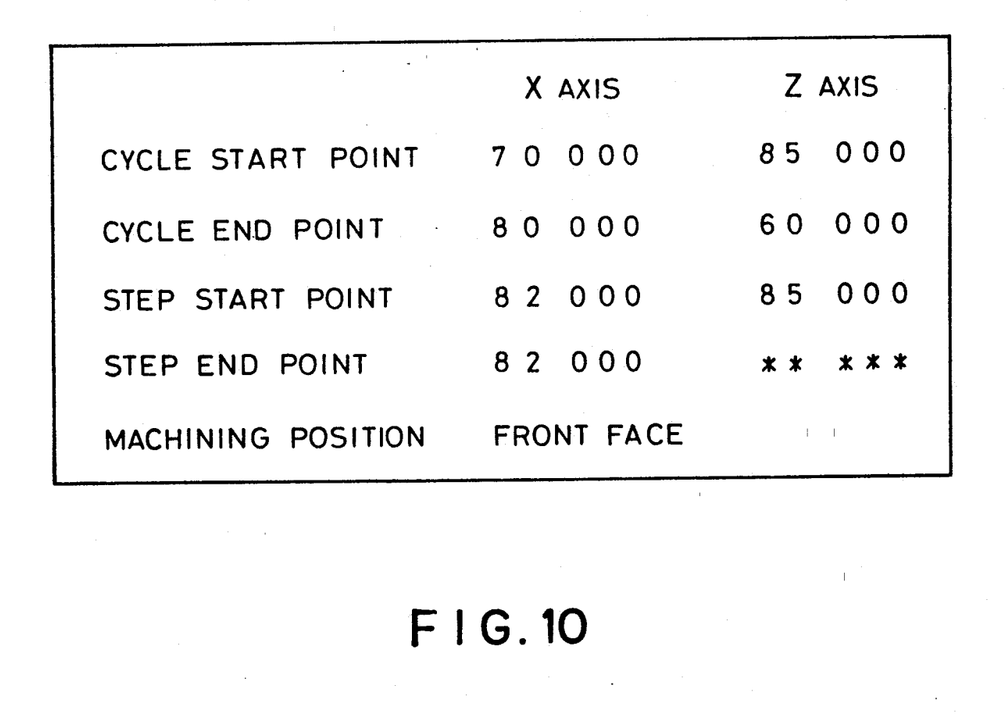
FIG. 10, shows an example of displayed machining data.

FIG. 10 shows an example of displayed machining data wherein only the X axis is moved in the positive direction after the completion of the machining cycle. In the figure, ",*" denote a state where no data is set, or the blank data.

According to this invention, numerical control information may be prepared which can reduce the time required for moving a tool between the machining steps when the same tool is used for plural machining steps and which can prevent interference between the tool and a work when the tool is moved from the tool change point to the cycle start point, or from the cycle end point to the tool change point, simply by generating the numerical control information on the paths of the tool movements between the machining steps, to and from the tool change point based on the information on the machining start point, the machining end point and the machining position information for each machining steps which the system is provided with.

It should be understood that any modifications and adaptions of the invention will become apparent to those skilled in the art and it is intended to encompass such obvious modifications and changes in the scope of the claims appended hereto.

What is claimed is:

1. A numerical control information generating system comprising:
    means for receiving data denoting a work shape prior to a machining process and a work shape upon completion of the machining process;
    means for dividing a work machining area, defined by a difference between the work shape upon completion of the machining process and the work shape prior to the machining process, into at least one subarea respectively corresponding to at least one sequential machining step of the machining process;
    mean for defining a distinct tool start point and tool end point associated with each sequential machining step of the machining process, wherein each tool start point and each end point are different points which vary from one sequential machining step to another; and,
    means for generating numerical control information defining a tool path of the machining process in which the tool path of each sequential machining step commences at the distinct tool start point associated therewith and terminates at the distinct tool path end point associated therewith.

2. A numerical control information generating system as recited in claim 1, wherein the numerical control information formed such that when said tool end point is designated, data denoting an axis where the tool need not be removed from said tool end point is kept blank so that when a tool is positioned at said tool end point after completion of said machining process, the tool is not moved with respect to said axis having blank data.

3. A numerical control information generating system as recited in claim 1, wherein each distinct tool stat point and each distinct tool end point is located external an area defined by the work shape prior to the machining process.

4. A numerical control information generating system as recited in claim 1, wherein each distinct tool start point and each distinct tool end point is located external an area obtained based on the work shape prior to the machining process and a work shape immediately prior to an associated machining step.

5. A numerical control information system as recited in claim 1, further comprising means for modifying said distinct tool start point and tool end point to arbitrary positions.

6. A numerical control information generating system as recited in claim 1, further comprising means for forming, for each machining step, position data denoting a positional relationship between the work shape upon completion of the machining process and each machining step so as to determine a tool path from a tool change position to said distinct tool start point and from said distinct tool end point to said tool change position.

7. A numerical control generating system as recited in claim 6, wherein said position data is classified into outer face data, inner face data, front face data, outer rear face data and inner rear face data.

8. A numerical control generating system as recited in claim 1, wherein a same tool is used to effect plural sequential machining steps of the machining process, and wherein the numerical control information define the tool path such that the same tool travels from a tool end point of a prior machining step to a tool start position of a next machining step.

* * * * *